US008988705B2

(12) United States Patent
Watanabe

(10) Patent No.: US 8,988,705 B2
(45) Date of Patent: Mar. 24, 2015

(54) IMAGE PROCESSING APPARATUS CAPABLE OF CONTROLLING THE EXECUTION OF AN IMAGE PROCESSING COMMAND TRANSMITTED FROM A CLIENT TERMINAL

(75) Inventor: Kenichi Watanabe, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 990 days.

(21) Appl. No.: 12/707,281

(22) Filed: Feb. 17, 2010

(65) Prior Publication Data
US 2010/0214605 A1 Aug. 26, 2010

(30) Foreign Application Priority Data

Feb. 25, 2009 (JP) ................................. 2009-042607

(51) Int. Cl.
G06F 3/12 (2006.01)
G06F 21/71 (2013.01)
H04N 1/00 (2006.01)
H04N 1/44 (2006.01)

(52) U.S. Cl.
CPC ............ G06F 21/71 (2013.01); H04N 1/00222 (2013.01); H04N 1/00925 (2013.01); H04N 1/4433 (2013.01); G06F 3/1222 (2013.01); G06F 3/1238 (2013.01); G06F 3/1288 (2013.01); H04N 1/4406 (2013.01); H04N 2201/0074 (2013.01); H04N 2201/0094 (2013.01); G06F 3/1239 (2013.01)
USPC ............ 358/1.15; 358/1.14; 358/1.6; 358/1.1

(58) Field of Classification Search
None
See application file for complete search history.

(56) References Cited

U.S. PATENT DOCUMENTS

| 7,382,487 B2* | 6/2008 | Ikegami ........................ 358/1.6 |
| 7,982,897 B2* | 7/2011 | Ito ................................ 358/1.15 |
| 2005/0219612 A1* | 10/2005 | Nakagawa .................... 358/1.15 |
| 2005/0275876 A1* | 12/2005 | McLean et al. ............... 358/1.15 |
| 2008/0204799 A1* | 8/2008 | Sato ............................. 358/1.15 |

FOREIGN PATENT DOCUMENTS

| JP | 2002-169673 | 6/2002 |
| JP | 2005-354402 | 12/2005 |
| JP | 2006-287945 | 10/2006 |
| JP | 2007-172054 | 7/2007 |
| JP | 2008-204385 | 9/2008 |

OTHER PUBLICATIONS

Japanese Official Action dated Feb. 1, 2011 together with English translation.

* cited by examiner

Primary Examiner — Paul F Payer
(74) Attorney, Agent, or Firm — Scully, Scott, Murphy & Presser, PC

(57) ABSTRACT

An image processing apparatus for executing image processing on the basis of a command transmitted from a communication terminal is provided. The image processing apparatus includes: a communication unit that performs communication with the communication terminal; an execution unit that executes the image processing on the basis of the command transmitted from the communication terminal; a determination unit that determines whether or not to permit the execution unit to execute the image processing based on the command without passing through a communication terminal serving as a management terminal; and a control unit that prohibits the image processing based on the command without passing through the management terminal when the determination unit determines that the execution of the image processing is not permitted.

7 Claims, 6 Drawing Sheets

IMAGE PROCESSING APPARATUS CAPABLE OF CONTROLLING THE EXECUTION OF AN IMAGE PROCESSING COMMAND TRANSMITTED FROM A CLIENT TERMINAL

CROSS REFERENCE TO RELATED APPLICATION

The present application claims priority from Japanese Patent Application No. 2009-042607, which was filed on Feb. 25, 2009, the disclosure of which is herein incorporated by reference in its entirety.

TECHNICAL FIELD

Apparatuses and devices consistent with the present invention relate to an image processing apparatus and a program.

BACKGROUND

In an office, there is a system in which a plurality of communication terminals and an image processing apparatus, such as an image forming apparatus, are connected to each other through a network, and the communication terminals use in common (share) the image processing apparatus. And, regarding the above described system, a technique is suggested for managing the use of the image processing apparatus by the communication terminals.

For example, a related art image forming apparatus management system is known in which an image forming apparatus on a network is prevented from being used by an unauthorized ID. Specifically, in the related art image forming apparatus management system, when a user inputs his/her specific code on a computer (communication terminal) and accesses a database server (management terminal) to install a printer driver, the installment of the printer driver is permitted only when the specific code is identical to an identification code stored in advance in the database server.

However, in the related art image forming apparatus management system, when the printer driver is available without accessing the database server and installable on a computer, the image forming apparatus may be used freely outside the management of the database server.

SUMMARY

The invention has been finalized in consideration of the above-described situation, and it is an object of the invention to provide an image processing apparatus and a computer readable medium storing a program capable of suppressing the use of an image processing apparatus outside the management of a management terminal.

According to an illustrative aspect of the present invention, there is provided an image processing apparatus for executing image processing on the basis of a command transmitted from a communication terminal, the image processing apparatus comprising: a communication unit that performs communication with the communication terminal; an execution unit that executes the image processing on the basis of the command transmitted from the communication terminal; a determination unit that determines whether or not to permit the execution unit to execute the image processing based on the command without passing through a communication terminal serving as a management terminal; and a control unit that prohibits the image processing based on the command without passing through the management terminal when the determination unit determines that the execution of the image processing is not permitted.

Further, according to an another illustrative aspect of the present invention, there is provided a computer readable medium storing a program for causing a communication terminal communicably connected to an image processing apparatus to execute the steps of: transmitting a command for instructing the image processing apparatus to execute image processing; determining whether or not to permit execution of the image processing based on the command without passing through a communication terminal serving as a management terminal; and when it is determined in the step of determination that the execution of the image processing is not permitted, prohibiting transmission of the command to the image processing apparatus without passing through the management terminal.

Further, according to an another illustrative aspect of the present invention, there is provided a computer readable medium storing a program for causing a communication terminal communicably connected to an image processing apparatus to execute the steps of: determining whether or not to permit execution of image processing based on the command without passing through a communication terminal serving as a management terminal; and when it is determined in the step of determination that the execution of the image processing is not permitted, prohibiting installment of a program for transmitting the command under a condition in which the transmission of the command without passing through the management terminal is permitted.

According to the invention, it is possible to suppress the use of the image processing apparatus outside the management of the management terminal.

BRIEF DESCRIPTION OF THE DRAWINGS

Illustrative aspects of the invention will be described in detail with reference to the following figures wherein.

DETAILED DESCRIPTION OF EXEMPLARY EMBODIMENTS OF THE PRESENT INVENTION

First Embodiment

Figure 1:
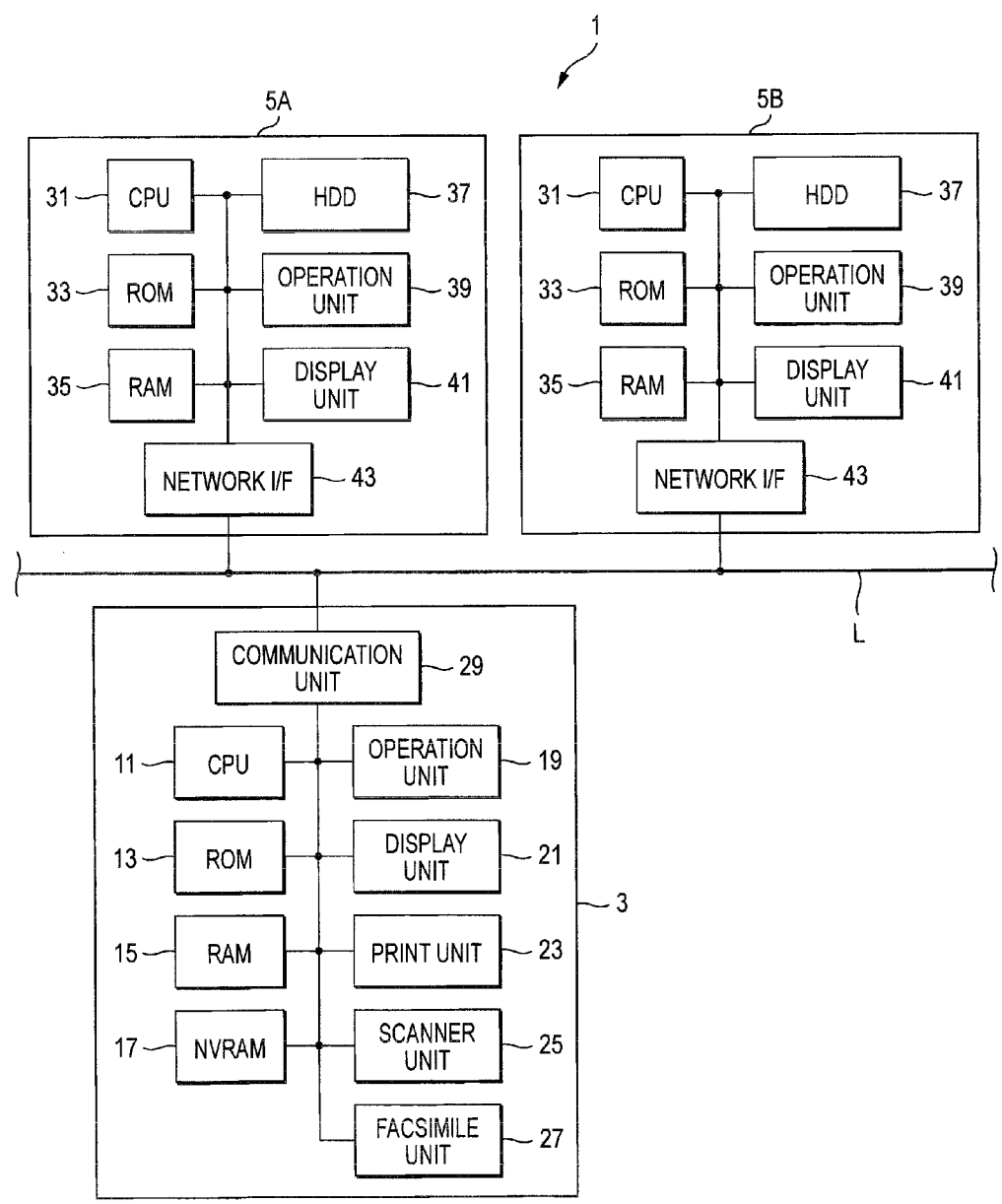
FIG. 1 is a block diagram showing the electrical configuration of an image forming system according to a first embodiment of the invention.

A first embodiment of the invention will be described with reference to FIGS. 1 to 4.
(1) Electrical Configuration of Image Forming System FIG. 1 is a block diagram showing the electrical configuration of an image forming system 1.

The image forming system 1 is configured such that an image forming apparatus 3 (image processing apparatus) is connected to a plural number (two in FIG. 1) of communication terminals 5 (for example, personal computers) through a network line L.

(1-1) Image Forming Apparatus

The image forming apparatus 3 is a multi-function device having a print function, a copy function, a facsimile function, and the like, and includes a CPU 11 (determination unit, control unit), a ROM 13, a RAM 15, a NVRAM 17 (nonvolatile memory), an operation unit 19, a display unit 21, a print unit 23, a scanner unit 25, a facsimile unit 27, a communication unit 29, and the like.

The ROM 13 stores a program for controlling the basic operation of the image forming apparatus 3 and a program for compulsory server management processing described below. The CPU 11 controls the operation of the image forming apparatus 3 while storing a processing result in the RAM 15 or NVRAM 17 in accordance with the program read from the ROM 13.

The operation unit 19 has a plurality of buttons and the like, and a user can perform various input operations, such as an execution command of image processing, sharing setting, and the like, through the operation unit 19. Image processing includes print processing, scanner (image reading) processing, facsimile communication processing (PC facsimile processing), and the like. The display unit 21 is composed of a liquid crystal display or a lamp, and can display various setting screens, operation states, and the like.

When receiving an execution command of print processing from the operation unit 19 or from the communication terminal 5 through the communication unit 29, the print unit 23 (execution unit) executes printing onto a sheet on the basis of print data. When receiving an execution command of scanner processing from the operation unit 19 or from the communication terminal 5 through the communication unit 29, the scanner unit 25 (execution unit) reads an image of an original document place on a platen (not shown) of the image forming apparatus 3 so as to generate print data. When receiving an execution command of facsimile communication processing from the operation unit 19 or from the communication terminal 5 through the communication unit 29, the facsimile unit 27 (execution unit) exchanges facsimile data with another facsimile machine through a telephone line (not shown).

The communication unit 29 includes a plurality of communication ports, such as a network port (for example, a LAN port), a local port (for example, a USB port), and the like. In FIG. 1, the network port is connected to the network line L, and the image forming apparatus 3 is configured to perform data communication with the respective communication terminals 5.

(1-2) Communication Terminal

Each communication terminal 5 includes a CPU 31, a ROM 33, a RAM 35, a hard disk 37, an operation unit 39, a display unit 41, a network interface 43, and the like. The hard disk 37 stores various programs, such as application software for creating print data, a printer driver, and the like. The operation unit 39 includes a keyboard or a pointing device, and the display unit 41 includes, for example, a liquid crystal display or the like. The network interface 43 is connected to the network line L.

(2) Printer Sharing

In the image forming system 1, for example, a communication terminal 5A serves as a server terminal (management terminal), and it is assumed that the server terminal 5A is requested to perform batch management of the use of the image forming apparatus 3 by another communication terminal 5 (hereinafter, referred to as "client terminal 5B"). A printer sharing function is used so as to perform batch management.

Specifically, for example, an administrator sets printer sharing relative to the image forming apparatus 3 by the server terminal 5A, and installs a printer drive of the image forming apparatus 3 as a shared client by the client terminal 5B. Thus, various execution commands (may include print data, scan data, facsimile data, or the like) from the client terminal 5B are transmitted to the image forming apparatus 3 through the server terminal 5A. Therefore, the server terminal 5A can perform various kinds of management, for example, restriction of the use of the image forming apparatus 3 by a specific user on the basis of the execution command, counting of the number of printed sheets, or the like.

Meanwhile, in the related art, even when printer sharing is set, the use of the image forming apparatus 3 from the client terminal 5B outside the management of the server terminal 5A, that is, transmission of the execution command from the client terminal 5B to the image forming apparatus 3 without passing through the server terminal 5A is easily made. For example, when a printer driver of the image forming apparatus 3 can be freely installed on the client terminal 5B, a peer-to-peer mode (an example of a mode for direct transmission of the execution command to the image forming apparatus 3) is assigned at the time of the installment, such that the image forming apparatus 3 can be used outside the management of the server terminal 5A. In addition, the client terminal 5B and the image forming apparatus 3 are locally connected to each other through a USB cable, which makes it possible to use the image forming apparatus 3 outside the management of the server terminal 5A. For this reason, thorough batch management by the server terminal 5A may not be performed only with related art printer sharing. Accordingly, the image forming system 1 executes compulsory server management processing so as to compel batch management.

(3) Compulsory Server Management Processing

Figure 2:
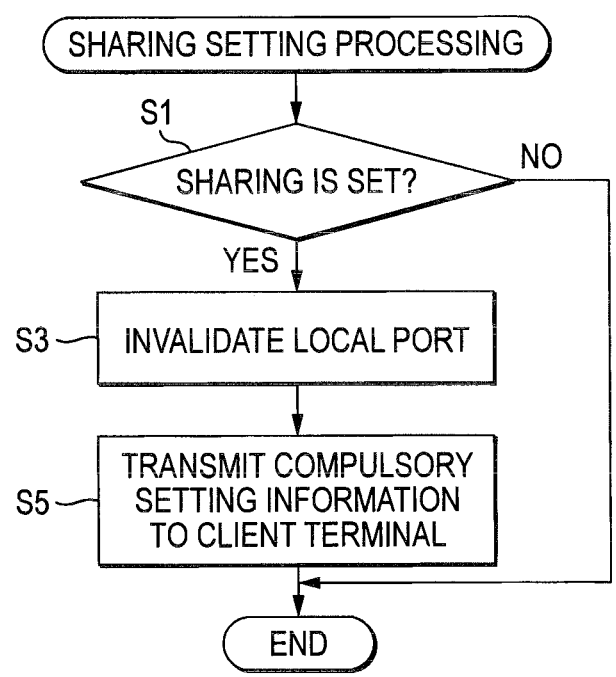
FIG. 2 is a flowchart showing sharing setting processing.
Figure 3:
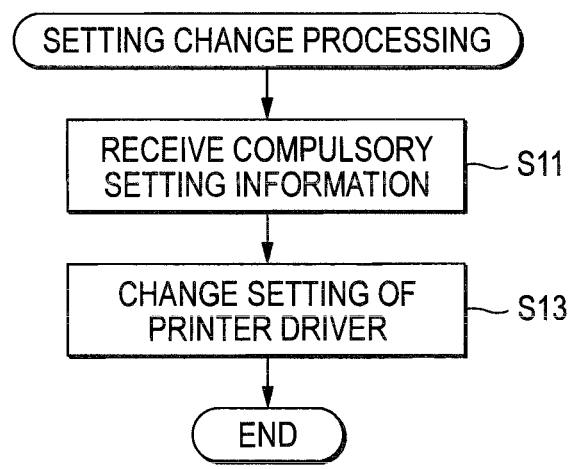
FIG. 3 is a flowchart showing setting change processing.
Figure 4:
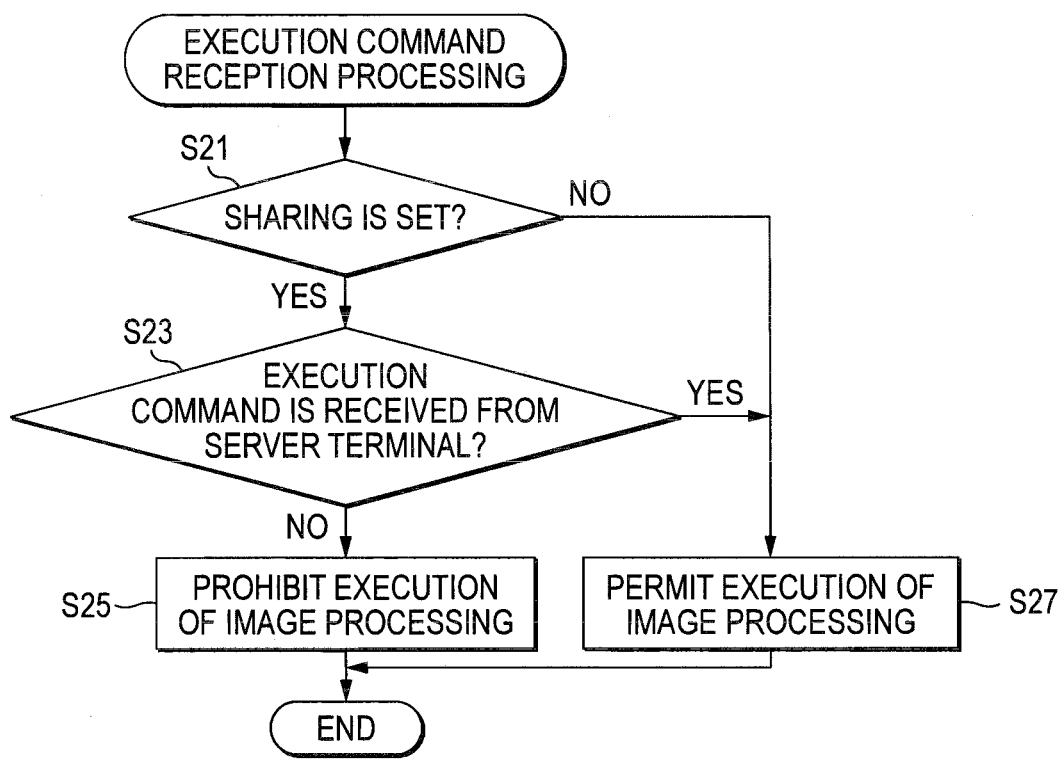
FIG. 4 is a flowchart showing execution command reception processing.

FIGS. 2 to 4 are flowcharts showing details of compulsory server management processing. The compulsory server management processing includes "sharing setting processing" and "execution command reception processing".

(3-1) Sharing Setting Processing

FIG. 2 is a flowchart showing sharing setting processing executed by the CPU 11 of the image forming apparatus 3. FIG. 3 is a flowchart showing setting change processing executed by the CPU 31 of the client terminal 5B. The CPU 11 executes the sharing setting processing regularly, for example, after the image forming apparatus 3 is activated.

In S1, it is determined whether or not sharing is set. In this case, the CPU 11 functions as a "determination unit". The term "sharing setting" means a setting purporting that execution of image processing based on an execution command without passing through the server terminal 5A is not permitted for the image forming apparatus 3. For example, the administrator can perform an input operation of sharing setting through the operation unit 39 of the server terminal 5A or the operation unit 19 of the image forming apparatus 3.

When an input operation of sharing setting is made through the server terminal 5A, the CPU 11 inquires of the server terminal 5A whether sharing is set or not so as to perform the determination of S1 on the basis of the reply. When an input operation of sharing setting is made through the image forming apparatus 3, the determination of S1 is performed on the basis of the input operation. When it is determined that sharing is set (S1: YES), the CPU 11 progresses to S3.

In S3, communication through the local port of the communication unit 29 (an example of "communication through a communication unit which is not connected to the management terminal") is invalidated so as to prohibit image processing. As the invalidation method, for example, reception from the local port may be rejected, or reception may be permitted but the received execution command may be discarded.

Thus, even if a communication terminal 5 other than the server terminal 5A is locally connected to the image forming apparatus 3, direct transmission of an execution command from the communication terminal 5 to the image forming apparatus 3 is impossible. Therefore, it is possible to suppress the use of the image forming apparatus 3 from the communication terminal 5 outside the management of the server terminal 5A. Next, the CPU 11 progresses to S5.

In S5, compulsory setting information (an example of "setting information") is transmitted to the client terminal 5B through the network line L, and the sharing setting processing ends. The compulsory setting information is information for compelling setting of transmission of an execution command to the client terminal 5B through the server terminal 5A. When sharing setting is made by the image forming apparatus 3, the compulsory setting information is also transmitted to the server terminal 5A.

On the other hand, when receiving the compulsory setting information in S11 of FIG. 3, in S13, the CPU 31 of the client terminal 5B compulsorily executes setting change of the printer driver of the image forming apparatus 3 on the basis of the compulsory setting information. Thus, even though a peer-to-peer mode has already been assigned in the client terminal 5B, sharing change to sharing setting of transmission of an execution command through the server terminal 5A is made.

(3-2) Execution Command Reception Processing

FIG. 4 is a flowchart showing execution command reception processing executed by the CPU 11 of the image forming apparatus 3. The CPU 11 executes the execution command reception processing each time an execution command is transmitted from a communication terminal 5.

In S21, it is determined whether or not sharing of the image forming apparatus 3 is set. When sharing is not set (S21: NO), in S27, the CPU 11 permits execution of image processing based on the received execution command and ends the execution command reception processing. For example, when an execution command is a print request, print processing by the print unit 23 is executed. Meanwhile, if sharing is set (S21: YES), the CPU 11 progresses to S23.

In S23, it is determined whether or not the execution command is transmitted from the server terminal 5A. This determination can be performed on the basis of transmission source information (for example, user name or communication terminal name) appended to the execution command. Further, the server terminal 5A may add predetermined additional information (flag or the like) to an execution command transmitted to the image forming apparatus 3 through the server terminal 5A, and the determination may be performed on the basis of presence/absence of the additional information.

When it is determined positively that the execution command is transmitted from the server terminal 5A (S23: YES), the CPU 11 regards the execution command as being transmitted on the basis of an input operation through the server terminal 5A or as being transmitted from the client terminal 5B through the server terminal 5A. Thus, in S27, image processing is permitted (S27), and the execution command reception processing ends.

Meanwhile, when it is determined negatively that no execution command is transmitted from the server terminal 5A (S23: NO), it can be recognized that the image forming apparatus 3 may be used outside the management of the server terminal 5A. Thus, in S25, execution of image processing is prohibited, and the execution command reception processing ends.

For example, after the above-described sharing setting processing, the printer driver of the image forming apparatus 3 may be installed on the client terminal 5B while the peer-to-peer mode is assigned. In such a case, image processing based on an execution command without passing through the server terminal 5A is prohibited by the execution command reception processing, so it is possible to suppress the use of the image forming apparatus 3 outside the management of the server terminal 5A.

Second Embodiment

Figure 5:
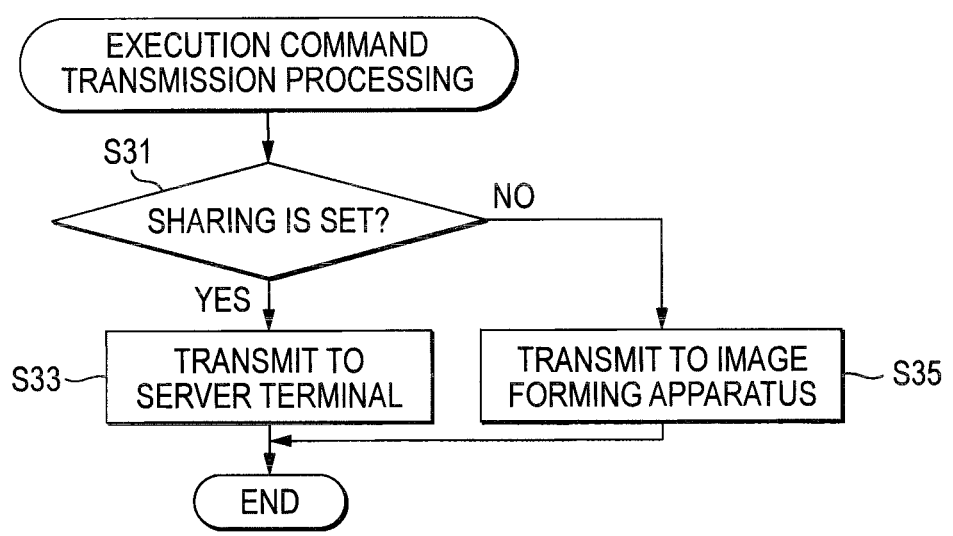
FIG. 5 is a flowchart showing execution command transmission processing of a second embodiment.

FIG. 5 shows a second embodiment. The first embodiment has the configuration that processing for compelling server management is primarily performed by the image forming apparatus 3. In contrast, the second embodiment has a configuration that the processing for compelling server management is performed by the client terminal 5B. Other points are the same as in the first embodiment. Therefore, the same parts are represented by the same reference numerals as in the first embodiment, and overlap description will not be repeated. Only a difference will be hereinafter described.

FIG. 5 is a flowchart showing execution command transmission processing executed by the CPU 31 of the client terminal 5B. The CPU 11 executes the execution command transmission processing as one of processing of the printer driver (an example of "a program for transmitting a command") of the image forming apparatus 3. The execution command transmission processing process is incorporated into the printer driver and installed on the client terminal 5B together with the printer driver.

In S31, it is determined whether or not sharing of the image forming apparatus 3 corresponding to the activated printer driver is set (an example of "a step of determination"). This determination may be performed on the basis of a reply to an inquiry of the server terminal 5A or the image forming apparatus 3 whether sharing is set or not.

If sharing is not set (S31: NO), in S35, an execution command is directly transmitted to the image forming apparatus 3, and the execution command transmission processing ends. Meanwhile, if sharing is set (S31: YES), in S33, the execution command is transmitted to the server terminal 5A, and the execution command transmission processing ends. Thus, the execution command is compulsorily transmitted to the image forming apparatus 3 through the server terminal 5A. In other words, transmission of the execution command to the image forming apparatus 3 without passing through the server terminal 5A is prohibited (an example "a step of transmission or prohibition").

According to this embodiment, when sharing is set, the client terminal 5B voluntarily prohibits transmission of an execution command to the image forming apparatus 3 without passing through the server terminal 5A. Therefore, even though the peer-to-peer mode is assigned in the communication terminal 5B, it is possible to suppress the use of the image forming apparatus 3 outside the management of the server terminal 5A. In addition, instead of simply prohibiting transmission of an execution command, the execution command is compulsorily transmitted to the image forming apparatus 3 through the server terminal 5A. Therefore, even though the peer-to-peer mode is assigned in the communication terminal 5B, it is possible for the server terminal 5A to manage the use of the image forming apparatus 3 while leaving room for the execution of image processing based on the execution command.

Third Embodiment

Figure 6:
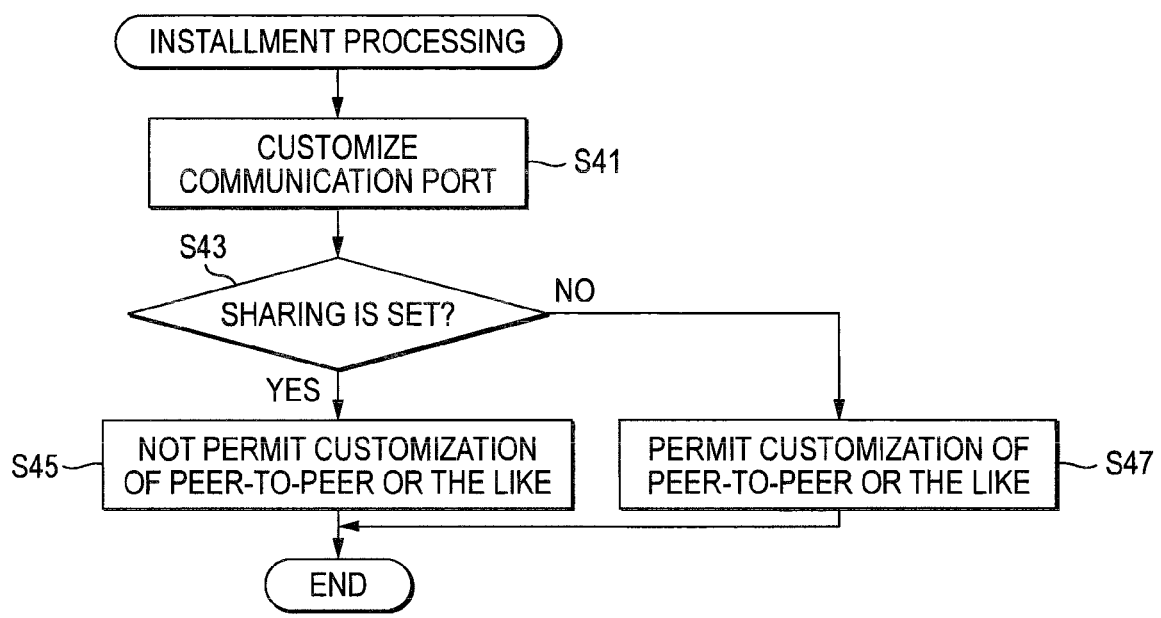
FIG. 6 is a flowchart showing installment processing of a third embodiment.

FIG. 6 shows a third embodiment. The first embodiment has the configuration that processing for compelling server management is primarily performed by the image forming apparatus 3. In contrast, the third embodiment has a configuration that processing for compelling server management is performed by the client terminal 5B. Other points are the same as in the first embodiment. Therefore, the same parts are represented by the same reference numerals as in the first embodiment, and overlap description will not be repeated. Only a difference will be hereinafter described.

FIG. 6 is a flowchart showing installment processing executed by the CPU 31 of the client terminal 5B. In FIG. 6, general processing from the installment processing will be omitted. The CPU 11 executes the installment processing so as to install the printer driver of the image forming apparatus 3. A program (installer) of the installment processing is attached to a program of the printer driver.

In S41, a communication port is assigned as a setting item of installment on the basis of an input operation of the user through the operation unit 39, and the process progresses to S43.

In S43, the image forming apparatus 3 is specified from the assigned communication port, and it is determined whether or not sharing of the image forming apparatus 3 is set (an example of "a step of determination"). When information regarding sharing setting is stored in the server terminal 5A, the determination of S43 is performed on the basis of a reply to an inquiry of the server terminal 5A whether sharing is set or not. When information regarding sharing setting is stored in the image forming apparatus 3, the determination of S43 is performed on the basis of a reply to an inquiry of the image forming apparatus 3 whether sharing is set or not.

If sharing is not set (S43: NO), in S47, installment with peer-to-peer assigned is permitted, and after the printer driver is installed, the installment processing ends. Meanwhile, if sharing is set (S43: YES), in S45, installment with peer-to-peer or a local port assigned is prohibited (an example of "prohibition"). For example, a method of prohibiting installment itself is used. Further, a method may be used in which peer-to-peer is set to be unassignable so as to compel installment as a shared client (an example of "compulsory processing").

According to this embodiment, when the printer driver of the image forming apparatus 3 is installed on the client terminal 5B, when sharing is set with respect to the image forming apparatus 3, installment with peer-to-peer or the like assigned is prohibited. Thus, it is possible to suppress the use of the image forming apparatus 3 outside the management of the server terminal 5A.

Other Embodiments

The invention is not limited to the embodiments described in the specification and the drawings, and various embodiments described below still fall within the technical scope of the invention. Of the constituent elements of the respective embodiments, constituent elements other than the constituent elements of the top level invention are additional elements, so they can be suitably omitted.

(1) Although in the foregoing embodiments, the image forming apparatus 3 as a multi-function device has been described, the invention is not limited thereto. An image processing apparatus may be used which can execute at least one of image processing, such as print processing, scanner processing, facsimile transmission processing, and the like.

(2) Although in the foregoing embodiments, an example where sharing setting is collectively made for all the functions of the image forming apparatus 3 has been described, the invention is not limited thereto. At least one of print processing, scanner processing, facsimile transmission processing, and the like may be selected and sharing setting may be made. For example, when sharing setting is set for only print processing, print processing based on an execution command without passing through the server terminal 5A is prohibited, and other processing is permitted regardless of whether or not the execution command passes through the server terminal 5A.

(3) Information regarding sharing setting (rejection information that image processing based on an execution command without passing through the server terminal 5A is not permitted) may be stored in the server terminal 5A, but the information regarding sharing setting is preferably stored in, for example, the NVRAM 17 (storage unit) of the image forming apparatus 3. In this way, even when communication with the server terminal 5A is impossible, the image forming apparatus 3 can determine whether sharing is set on the basis of the rejection information stored in the image forming apparatus 3, so it is possible to suppress the use of the image forming apparatus 3 outside the management of the server terminal 5A.

(4) For example, when the server terminal 5A is connected to the local port of the image forming apparatus 3, other ports (printer port or network port, an example of "a communication unit which is not connected to a management terminal" of the invention) may be invalidated.

According to a first aspect of the present invention, there is provided an image processing apparatus for executing image processing on the basis of a command transmitted from a communication terminal, the image processing apparatus comprising: a communication unit that performs communication with the communication terminal; an execution unit that executes the image processing on the basis of the command transmitted from the communication terminal; a determination unit that determines whether or not to permit the execution unit to execute the image processing based on the command without passing through a communication terminal serving as a management terminal; and a control unit that prohibits the image processing based on the command without passing through the management terminal when the determination unit determines that the execution of the image processing is not permitted.

With this configuration, when the determination unit determines that the execution is not permitted, the image processing apparatus prohibits image processing based on a command without passing through the management terminal. Therefore, it is possible to suppress the use of the image processing apparatus outside the management of the management terminal.

Further, according to a second aspect of the present invention, in addition to the first aspect, when the determination unit determines that the execution of the image processing is not permitted, the control unit transmits setting information, which includes information for transmitting the command through the management terminal, to the communication terminal through the communication unit.

With this configuration, the image processing apparatus transmits setting information for setting transmission of a command through the management terminal to the communication terminal. Therefore, even if setting regarding direct transmission of a command to the image processing apparatus is made by the communication terminal, it is possible to change the setting to a setting regarding transmission of a command through the management terminal.

Further, according to a third aspect of the present invention, in addition to the first or second aspect, when the determination unit determines that the execution of the image processing is not permitted, the control unit determines whether or not the command is transmitted from the management terminal, and when the control unit determines that the command is transmitted from the management terminal, the control unit permits the execution unit to execute the image processing, and when the control unit determines that the command is not transmitted from the management terminal, the control unit prohibits the execution unit to execute the image processing.

With this configuration, when a command is transmitted other than from the management terminal, image processing is prohibited, so it is possible to suppress the use of the image processing apparatus outside the management of the management terminal.

Further, according to a fourth aspect of the present invention, in addition to any one of the first aspect to the third aspect, when the determination unit determines that the execution of the image processing is not permitted, the control unit invalidates communication through the communication unit, which is not connected to the management terminal, so as to prohibit the image processing.

With this configuration, communication which is not connected to the management terminal is invalidated, so it is possible to suppress the use of the image processing apparatus outside the management of the management terminal.

Further, according to a fifth aspect of the present invention, in addition to any one of the first aspect to the fourth aspect, the image processing apparatus further comprises: a storage unit that stores rejection information stating that the execution by the execution unit is not permitted when the determination unit determines that the execution of the image processing is not permitted, wherein the determination unit performs the determination on the basis of the rejection information.

With this configuration, in the image processing apparatus, when the execution by the execution unit is not permitted, rejection information is stored. Therefore, even under the environment that rejection information cannot be acquired from the outside, the image processing apparatus can determine whether or not the use of the image processing apparatus is permitted, so it is possible to suppress the use of the image processing apparatus outside the management of the management terminal.

Further, according to a sixth aspect of the present invention, there is provided a computer readable medium storing a program for causing a communication terminal communicably connected to an image processing apparatus to execute the steps of: transmitting a command for instructing the image processing apparatus to execute image processing; determining whether or not to permit execution of the image processing based on the command without passing through a communication terminal serving as a management terminal; and when it is determined in the step of determination that the execution of the image processing is not permitted, prohibiting transmission of the command to the image processing apparatus without passing through the management terminal.

With this configuration, when the image processing of the image processing apparatus is not permitted, the communication terminal voluntarily prohibits transmission of a command for executing the image processing to the image processing apparatus without passing through the management terminal. Therefore, even though setting of direct transmission of a command to the image processing apparatus is made in the communication terminal, it is possible to suppress the use of the image processing apparatus outside the management of the management terminal.

Further, according to a seventh aspect of the present invention, in addition to the sixth aspect, when it is determined in the step of determination that the execution of the image processing is not permitted, the command is transmitted to the image processing apparatus through the management terminal in the step of transmission.

With this configuration, even when setting of direct transmission of a command to the image processing apparatus is made in the communication terminal, it is possible for the management terminal to manage the use of the image processing while leaving room for the use of the image processing.

Further, according to an eighth aspect of the present invention, there is provided a computer readable medium storing a program for causing a communication terminal communicably connected to an image processing apparatus to execute the steps of: determining whether or not to permit execution of image processing based on the command without passing through a communication terminal serving as a management terminal; and when it is determined in the step of determination that the execution of the image processing is not permitted, prohibiting installment of a program for transmitting the command under a condition in which the transmission of the command without passing through the management terminal is permitted.

With this configuration, when a program for transmitting a command is installed on the communication terminal, if the image processing of the image processing apparatus is not permitted, installment is prohibited of the setting of transmission of a command for executing the image processing to the image processing apparatus without passing through the management terminal. Therefore, it is possible to suppress the use of the image processing apparatus outside the management of the management terminal.

Further, according to a ninth aspect of the present invention, in addition to the eighth aspect, the program causes the communication terminal further to execute a step of: setting for transmitting the command to the image processing apparatus through the management terminal when it is determined in the step of determination that the execution of the image processing is not permitted.

What is claimed is:

1. An image processing apparatus for executing image processing by using a command transmitted from a client terminal, the image processing apparatus comprising:
  a communication unit configured to perform communication with the client terminal and a server terminal, wherein the server terminal is configured to receive a command from the client terminal and transmit the command to the image processing apparatus, and;
  a processor configured to:
    receive a particular command via the communication unit;
    determine whether or not the image processing apparatus is set to not permit execution of the image processing by using a particular command that is not transmitted via the server terminal;
    determine whether or not the received particular command is transmitted via the server terminal;
    when it is determined that the received particular command is transmitted via the server terminal and it is determined that the image processing apparatus is set to not permit execution of the image processing by using a particular command that is not transmitted via the server terminal, execute the image processing by using the received particular command;

when it is determined that the received particular command is not transmitted via the server terminal and it is determined that the image processing apparatus is set to not permit execution of the image processing by using the particular command that is not transmitted via the server terminal, prohibit the execution of the image processing by using the received particular command.

2. The image processing apparatus according to claim 1, wherein, the processor is further configured to:

when it is determined that the image processing apparatus is set to not permit the execution of the image processing by using a particular command that is not transmitted via the server terminal, transmit setting information to the client terminal via the communication unit, the setting information comprising a particular request for causing the client terminal to transmit any command to the server terminal such that the server terminal transmits the any command to the image processing apparatus.

3. The image processing apparatus according to claim 1, wherein the processor is further configured to:

when it is determined that the execution of the image processing is not permitted, invalidate communication through Abe communication unit which is not connected to the server terminal, so as to prohibit the image processing.

4. The image processing apparatus according to claim 1, further comprising:

a storage unit, wherein the processor is further configured to:

store in the storage unit rejection information stating that the execution of the image processing is not permitted, and determine that the image processing apparatus is set to not permit the execution of the image processing on the basis of the rejection information stored in the storage unit.

5. The image processing apparatus according to claim 1, wherein the processor is further configured to:

determine that the image processing apparatus is set to not permit the execution of the image processing by using a particular command that is not transmitted via the server terminal, then invalidate communication through a communication unit which is not connected to the server terminal so as to prohibit the execution of the image processing.

6. The image processing apparatus according to claim 1, wherein the processor is further configured to:

when it is determined that the image processing apparatus is set to not permit the execution of the image processing by using a particular command that is not transmitted via the server terminal, then determine whether the received particular command is transmitted via the server terminal or is not transmitted via the server terminal based on information appended to the received particular command, and when it is determined that the received particular command is not transmitted via the server terminal, prohibit the execution of the image processing.

7. The image processing apparatus according to claim 1, further comprising a memory wherein the processor is further configured to store in the memory information used for determining whether or not the image processing apparatus is set to permit execution of the image processing by using a particular command that is not transmitted via the server terminal.

\* \* \* \* \*